(12) United States Patent
Hancock

(10) Patent No.: US 9,179,685 B2
(45) Date of Patent: Nov. 10, 2015

(54) DEBONING MACHINE

(71) Applicant: Weiler and Company, Inc., Whitewater, WI (US)

(72) Inventor: Robin Hancock, Elkhorn, WI (US)

(73) Assignee: WEILER AND COMPANY, INC., Whitewater, WI (US)

( * ) Notice: Subject to any disclaimer, the term of this patent is extended or adjusted under 35 U.S.C. 154(b) by 0 days.

(21) Appl. No.: 14/601,667

(22) Filed: Jan. 21, 2015

(65) Prior Publication Data

US 2015/0201630 A1      Jul. 23, 2015

Related U.S. Application Data

(60) Provisional application No. 61/929,585, filed on Jan. 21, 2014.

(51) Int. Cl.
*A22C 25/16* (2006.01)
*A22C 17/00* (2006.01)
*A22B 5/00* (2006.01)

(52) U.S. Cl.
CPC ............. *A22C 17/004* (2013.01); *A22B 5/0035* (2013.01)

(58) Field of Classification Search
CPC .. A22C 17/00; A22C 17/004; A22C 17/0053; A22C 21/0069
USPC ................................................ 452/135–140
See application file for complete search history.

(56) References Cited

U.S. PATENT DOCUMENTS

| | | | |
|---|---|---|---|
| 2,149,582 A * | 3/1939 | Collins | 241/105 |
| 2,965,145 A | 12/1960 | Gutfreund | |
| 3,958,763 A | 5/1976 | Paoli | |
| 4,566,640 A * | 1/1986 | McFarland et al. | 241/74 |
| 5,213,541 A | 5/1993 | Richburg et al. | |
| 5,580,305 A * | 12/1996 | McFarland | 452/138 |
| 5,752,664 A * | 5/1998 | Satake et al. | 241/74 |
| 5,813,909 A * | 9/1998 | Goldston | 452/138 |
| 6,033,105 A | 3/2000 | Barker et al. | |
| 6,622,950 B1 * | 9/2003 | Fleming et al. | 241/74 |
| 2013/0206882 A1 | 8/2013 | Smith | |

OTHER PUBLICATIONS

International Search Report and Written Opinion for PCT/US2015/012205 dated May 4, 2015, 11 pages.

* cited by examiner

*Primary Examiner* — Richard Price, Jr.
(74) *Attorney, Agent, or Firm* — Klintworth & Rozenblat IP LLC

(57) ABSTRACT

A deboning machine according to some embodiments of the disclosure includes a housing, a separation chamber and auger. The housing has a passageway and ports for expelling meat and bone. The separation chamber is mounted in the passageway, and the auger extends through said separation chamber and the housing. An engagement structure provided on the housing and separation chamber engage with a camming action to provide a space between the separation chamber and the auger. During engagement, the auger is held stationary and the separation chamber is rotated relative to the auger.

17 Claims, 15 Drawing Sheets

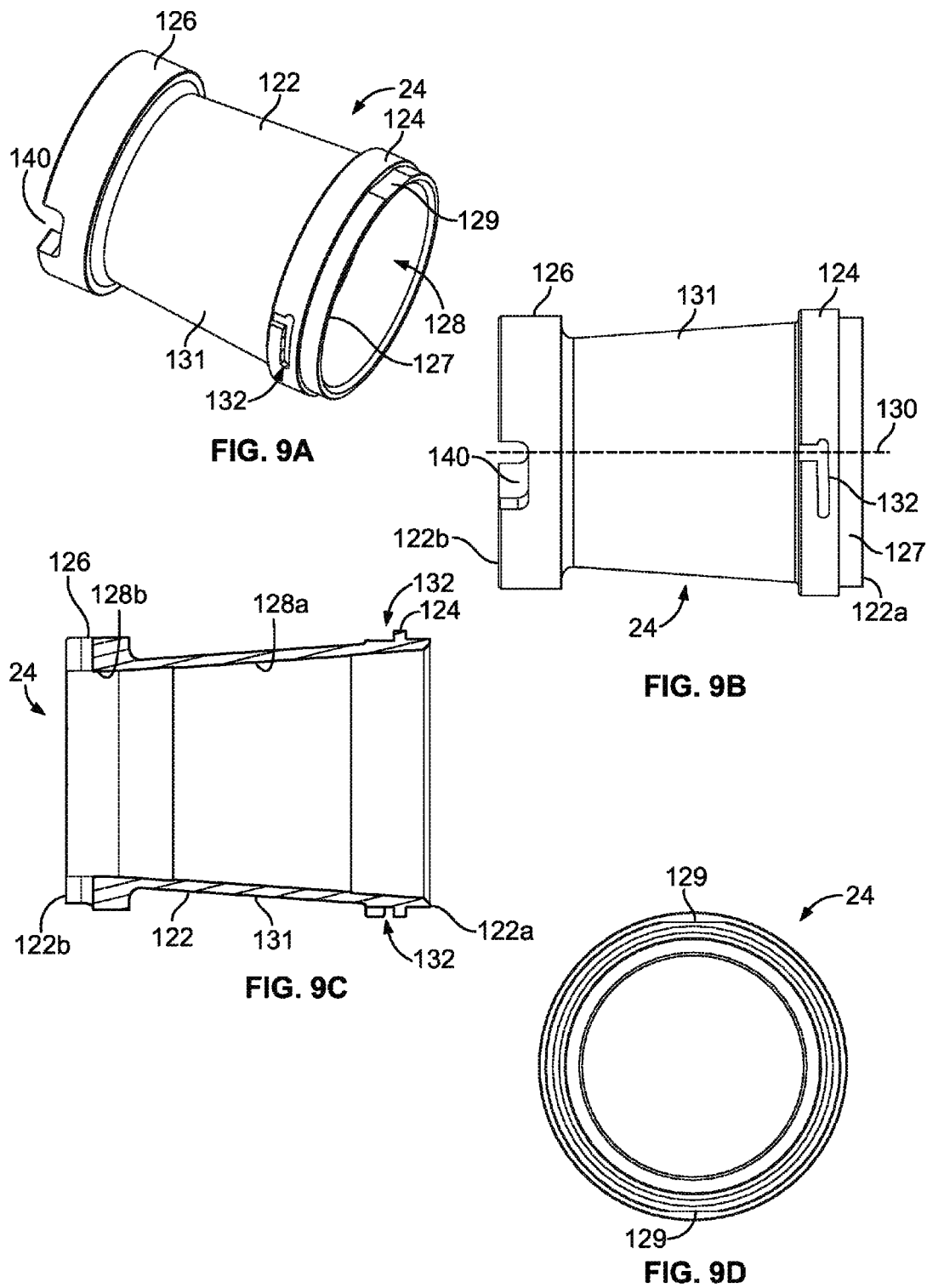

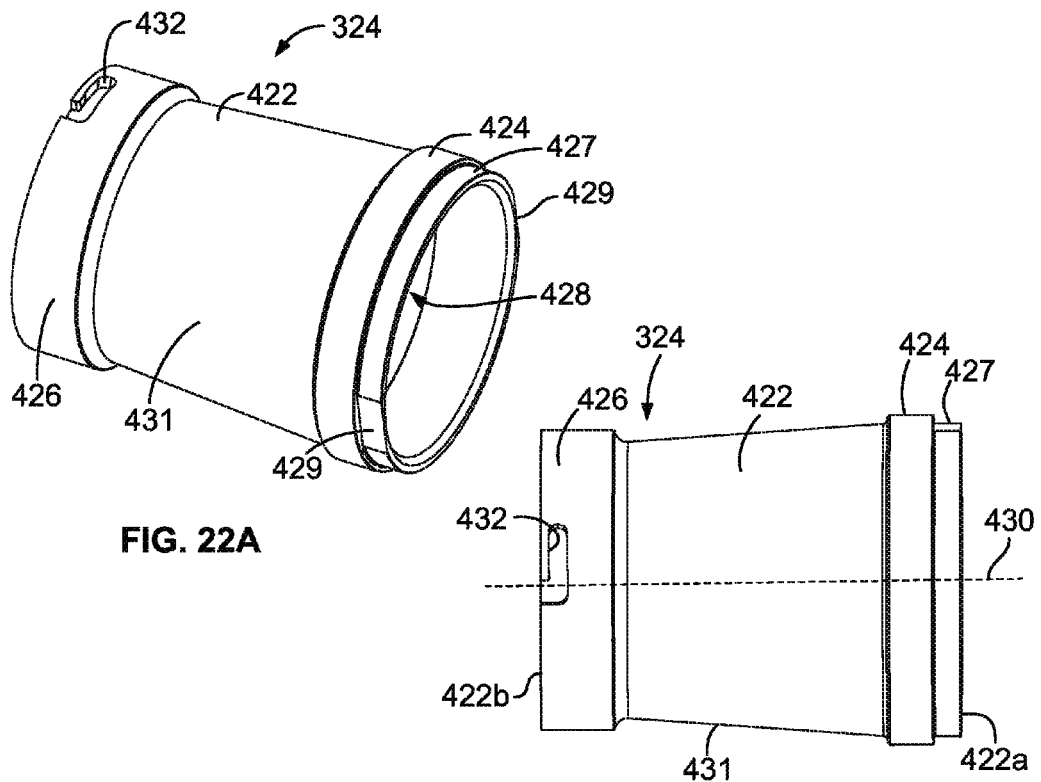
FIG. 22A
FIG. 22B
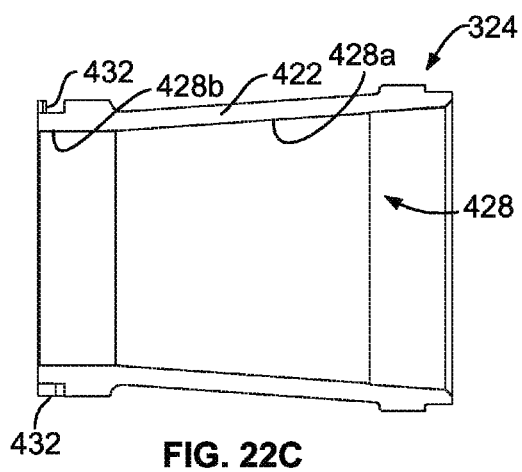
FIG. 22C
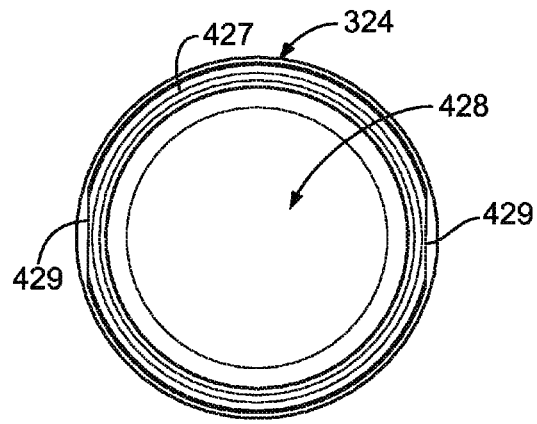
FIG. 22D

DEBONING MACHINE

This application claims the domestic benefit of U.S. Provisional Application Ser. No. 61/929,585, filed on Jan. 21, 2014, the contents of which are incorporated herein in its entirety.

FIELD OF THE INVENTION

The present disclosure relates generally to machines for deboning or separating meats, such as red meat, pork, poultry and fish, from bone, cartilage or sinew. More particularly, the present disclosure relates to an auger mount assembly and method for attaining a desired separation or working spacing between an outer radial surface of an auger and a radially interior facing surface of a separation chamber that is concentrically oriented about the auger.

BACKGROUND

Conventional deboning machines are disclosed in Applicant's U.S. Pat. Nos. 4,189,104 and 5,813,909. Conventional deboning machines may have difficulty establishing and maintaining acceptable working space between an auger and an interior surface of a separation chamber.

A deboning machine is provided herein which provides improvements to the existing prior art and which overcomes the disadvantages presented by the prior art. Other features and advantages will become apparent upon a reading of the attached specification, in combination with a study of the drawings.

SUMMARY

A deboning machine according to some embodiments of the disclosure includes a housing, a separation chamber and auger. The housing has a passageway and ports for expelling meat and bone. The separation chamber is mounted in the passageway, and the auger extends through said separation chamber and the housing. An engagement structure provided on the housing and separation chamber engage with a camming action to provide a space between the separation chamber and the auger. During engagement, the auger is held stationary and the separation chamber is rotated relative to the auger.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which:

FIG. 9A is a perspective view of a separation chamber of the deboning machine;

FIG. 9B is a side elevation view of the separation chamber;

FIG. 9C is a cross-sectional view of the separation chamber;

FIG. 9D is an end view of the separation chamber;

FIG. 22A is a perspective view of a separation chamber of the deboning machine of FIG. 17;

FIG. 22B is a side elevation view of the separation chamber of FIG. 22A;

FIG. 22C is a cross-sectional view of the separation chamber of FIG. 22A;

FIG. 22D is an end view of the separation chamber of FIG. 22A;

DETAILED DESCRIPTION OF THE ILLUSTRATED EMBODIMENTS

Figure 1:
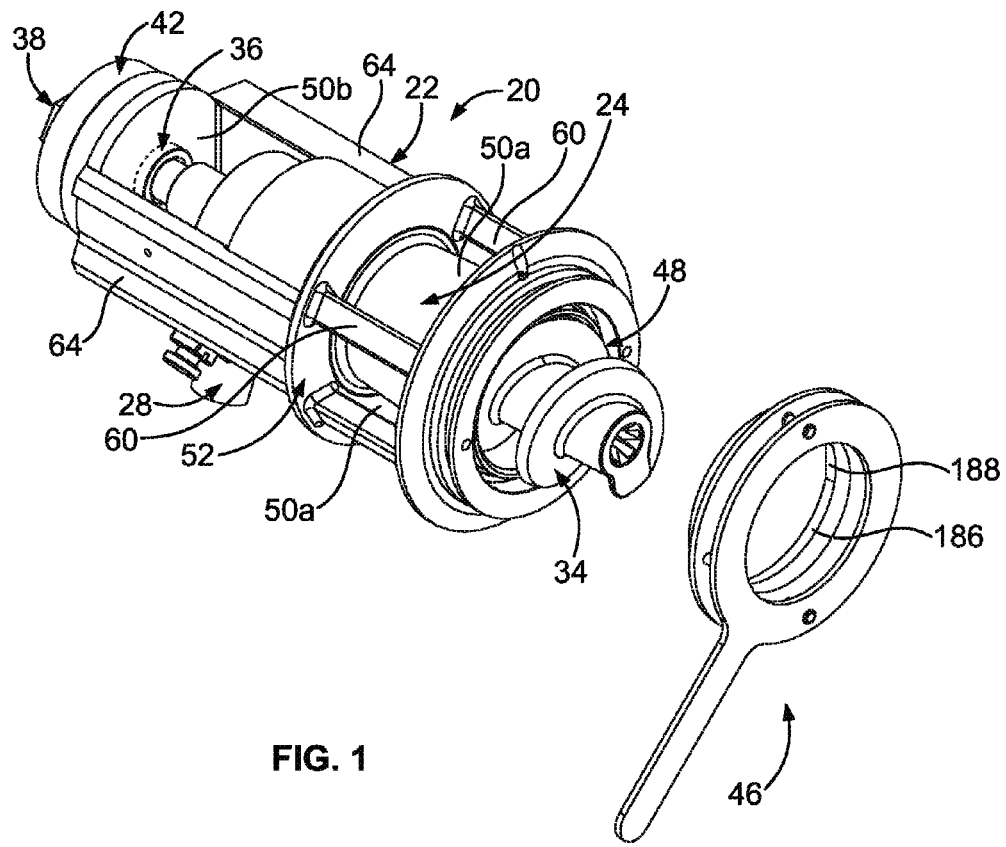
FIG. 1 is a perspective view of a deboning machine and a tool used to assemble the deboning machine, the deboning machine incorporating the features of a first embodiment.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

FIGS. 1-16B show a first embodiment of a deboning machine 20; and FIGS. 17-24B show a second embodiment of a deboning machine 320.

Figure 3:
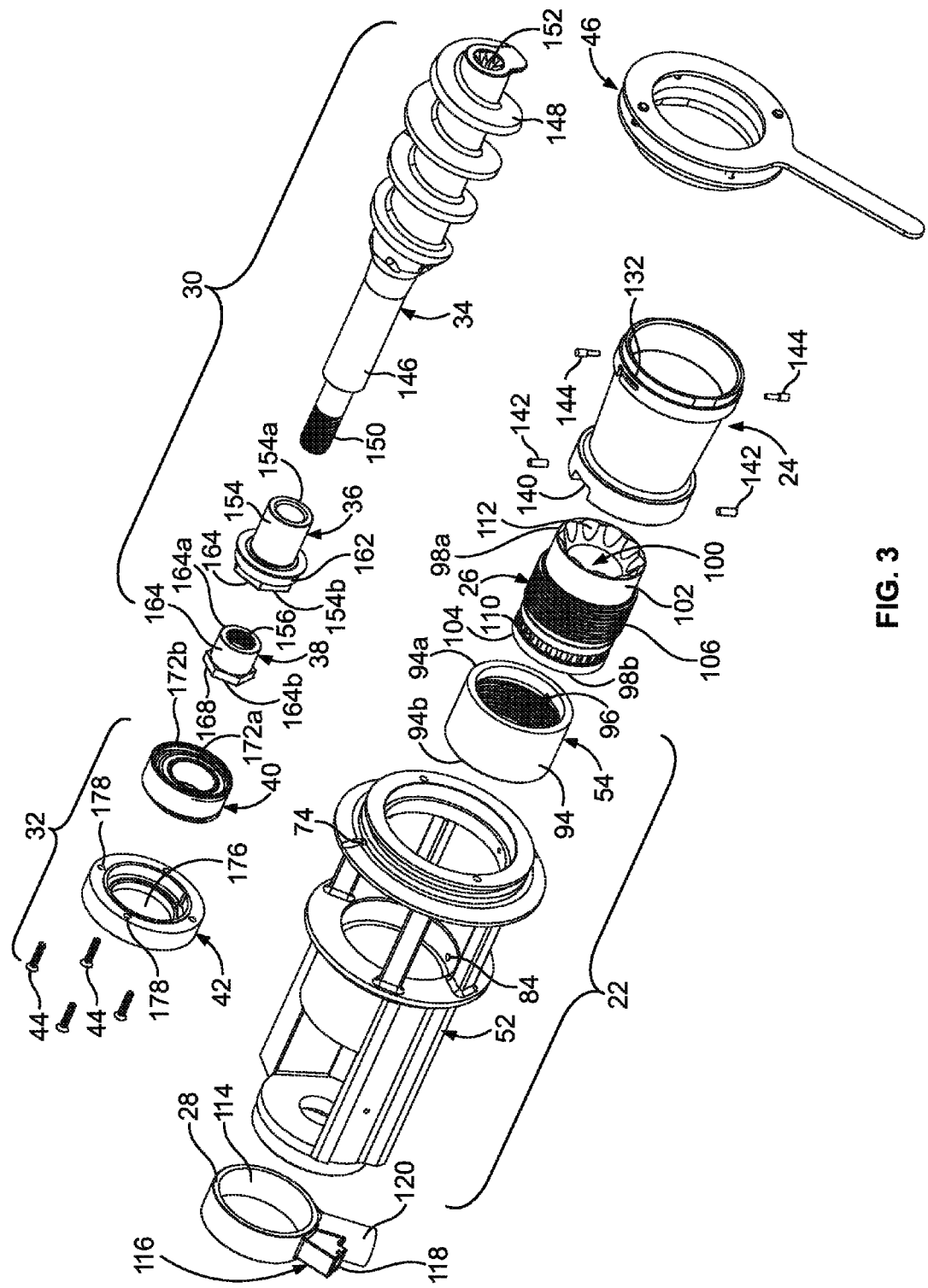
FIG. 3 is an exploded perspective view of the deboning machine and tool.

Attention is invited to the first embodiment of the deboning machine 20. The deboning machine 20 includes a housing 22 into which a separation chamber 24, a ring valve 26, a ratchet assembly 28, an auger assembly 30 and a bearing assembly 32 are mounted. As best shown in FIG. 3, the auger assembly 30 includes an auger 34, a bushing 36 and a jam nut 38. As best shown in FIG. 3, the bearing assembly 32 includes a bearing 40, an end plate 42 and fasteners 44 for connecting the end plate 42 to the housing 22 as described herein. A tool, such as wrench 46, see FIGS. 1, 3, 16A and 16B is used to assemble the deboning machine 20 by rotating the separation chamber 24 relative to the auger assembly 30. This is contrary to prior art methods where the auger is rotated relative to the separation chamber. In use, bone connected meat is feed into the deboning machine 20 at feed end 48, meat is expelled from the deboning machine 20 through meat discharge ports 50a and bone is expelled from the deboning machine 20 through bone discharge ports 50b.

The housing 22 is formed of an outer housing 52 and an inner housing 54. The inner housing 54 is mounted within the outer housing 52.

Figure 4:
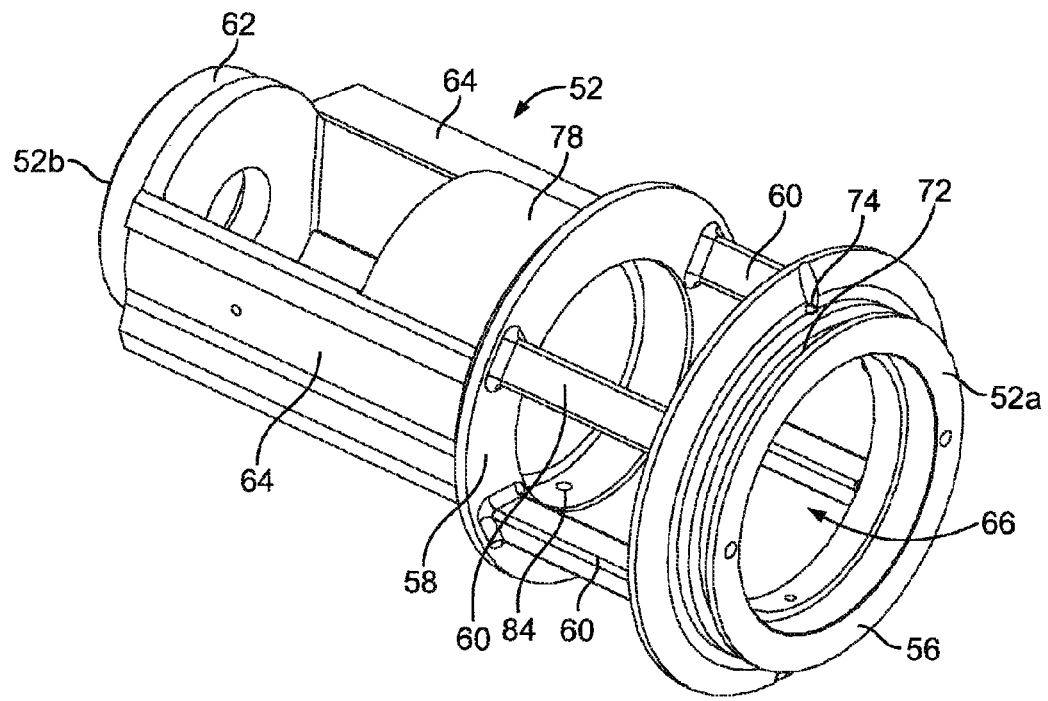
FIG. 4 is a perspective view of an outer housing of the deboning machine.
Figure 5:
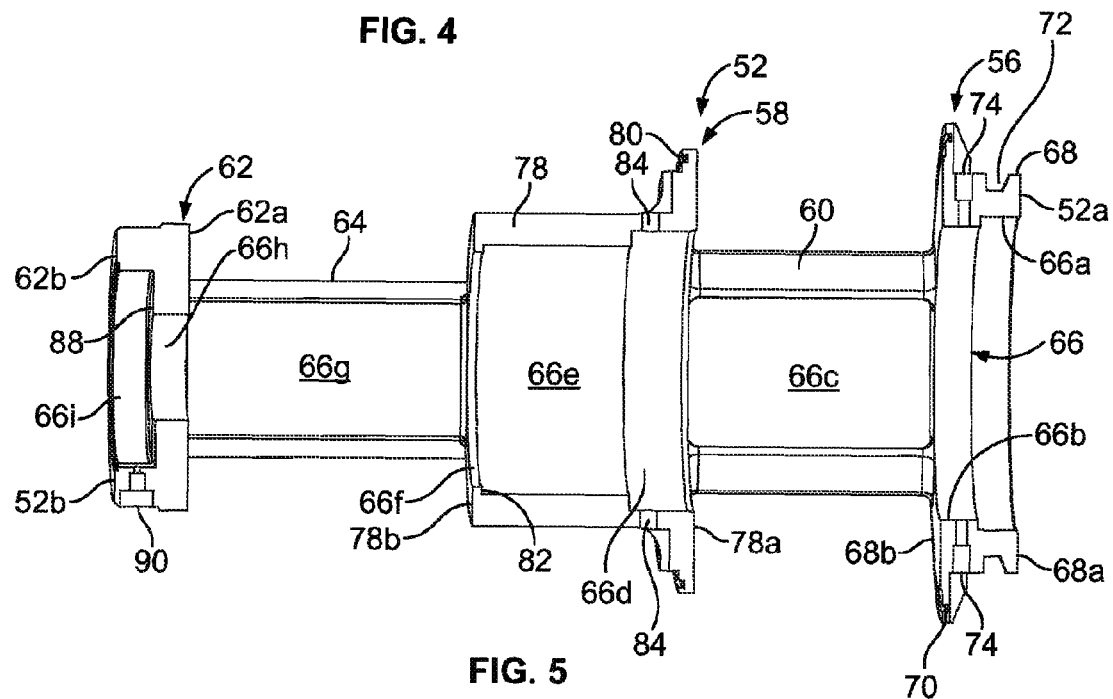
FIG. 5 is a cross-sectional view of the outer housing.

As best shown in FIGS. 4 and 5, the outer housing 52 includes a first ring 56 which is connected to a second ring 58 by a plurality of spaced apart legs 60, and a third ring 62 which is connected to the second ring 58 by a pair of spaced apart legs 64. A central passageway 66 is formed through the outer housing 52 and extends from a first end 52a of the outer housing 52 to a second end 52b of the outer housing 52. When the deboning machine 20 is assembled as discussed herein, the spaces between the legs 60 form the meat discharge ports 50a and the spaces between the legs 64 form the bone discharge ports 50b.

The first ring 56 is formed from a cylindrical wall 68 from which a circular flange 70 extends outwardly therefrom. The wall 68 has a first end 68a and a second opposite end 68b. The flange 70 extends outwardly from the wall 68 proximate to the second end 68b. An interior surface of the wall 68 defines a portion of the central passageway 66. The portion of the central passageway 66 through the first ring 56 has a first larger diameter section 66a which extends from the first end 68a toward the second end 68b, and a second smaller diameter section 66b which extends from the first section 66a to the second end 68b. The exterior surface of the wall 68 has a groove 72 provided thereon. A pair of diametrically opposed through holes 74 are provided through the wall 68 and are in communication with the central passageway 66.

The legs 60 are spaced apart from each other such that spaces are provided therebetween which form meat discharge ports 50a. The meat discharge ports 50a allow for the meat separated from the bone connected meat to exit the deboning machine 20 as described herein. The area between the legs 60 forms a section 66c of the central passageway 66 which is in axial alignment with the sections 66a, 66b in the first ring 56. The section 66c has a diameter which is smaller than the diameter of section 66b.

The second ring 58 is formed from a cylindrical wall 78 from which a circular flange 80 extends outwardly therefrom.

The wall 78 has a first end 78a and a second opposite end 78b. The flange 80 extends outwardly from the wall 78 proximate to the first end 78a. An interior surface of the wall 78 defines a portion of the central passageway 66. The portion of the central passageway 66 through the second ring 58 has a first larger diameter section 66d which extends from the first end 78a toward the second end 78b, a second smaller diameter section 66e which extends from the first section 66d to a third smaller diameter section 66f. The third section 66f terminates the second end 78b of the wall 78. The first section 66d has a diameter which is smaller than the diameter of the section 66b through the first ring 56 and which is larger than the diameter of the second section 66e. The second section 66e has a diameter which is greater than the third section 66f, such that a shoulder 82 is formed by the portion of the wall 78 forming the third section 66f. The sections 66d-66f are in axial alignment with the sections 66a-66c. A pair of diametrically opposed through holes 84 are provided through the wall 78 proximate to the first end 78a. The respective through holes 84 and through holes 74 axially align with each other.

The legs 64 are spaced apart from each other such that spaces are provided therebetween which form bone discharge ports 50b. The bone discharge ports 50b allow for bone separated from the bone connected meat to exit the deboning machine 20 as described herein. The area between the legs 64 forms a section 66g of the central passageway 66 which is in axial alignment with the sections 66a-66f. The section 66g has a diameter which is smaller than the diameter of section 66f.

The third ring 62 is formed from a cylindrical wall having a first end 62a and a second opposite end 62b. An interior surface of the third ring 62 defines a portion of the central passageway 66. The portion of the central passageway 66 through the third ring 62 has a first smaller diameter section 66h which extends from the first end 62a to a second smaller diameter section 66i which extends from the first section 66d to the second end 62b. The first section 66h has a diameter which is smaller than the diameter of the section 66g. The second section 66i has a diameter which is greater than the first section 66h, such that a shoulder 88 is formed by the portion of the wall forming the second section 66i. The sections 66h, 66i are in axial alignment with the sections 66a-66g. A through hole 90 is provided through the wall proximate to the second end 62b. A plurality of bind bores are provided in the second end 62b of the third ring 62.

Figures 6, 7:
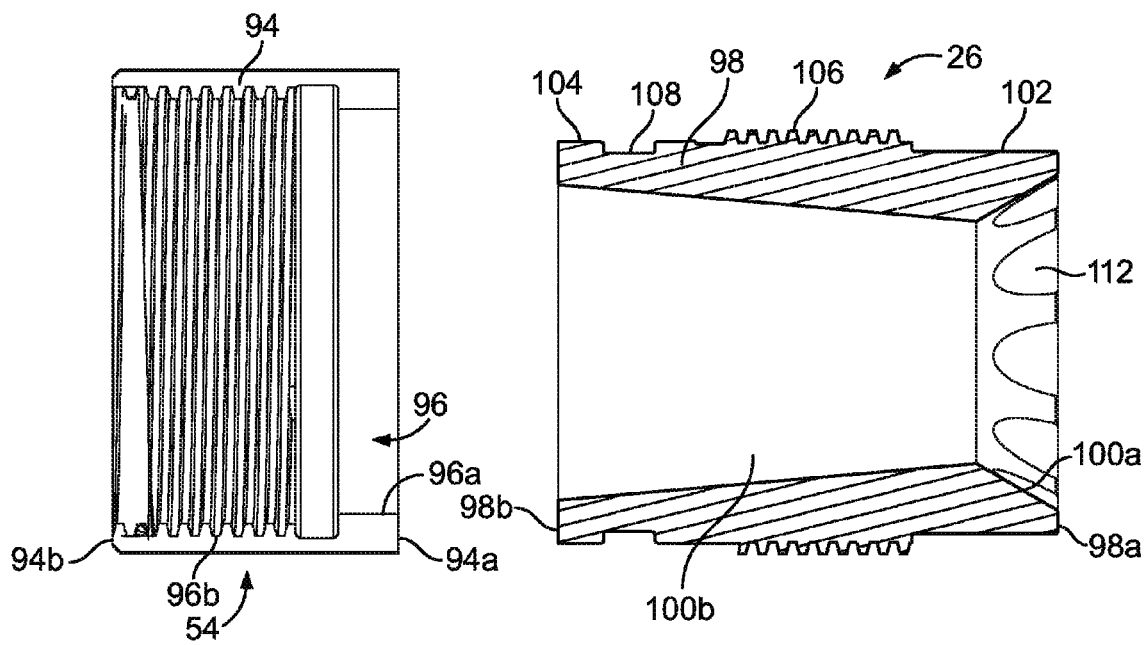
FIG. 6 is a cross-sectional view of an inner housing of the deboning machine.
FIG. 7 is a cross-sectional view of a ring valve of the deboning machine.

The inner housing 54, see FIG. 6, is formed from a cylindrical wall 94 having first and second ends 94a, 94b, and a central passageway 96 extending axially therethrough. The central passageway 96 has a first unthreaded section 96a extending from the first end 94a to a second threaded section 96b which extends between the first unthreaded section 96a and the second end 94b. The inner housing 54 seats within second section 66e in the second ring 58 of the outer housing 52 and bears against the shoulder 82 in the second ring 58.

The ring valve 26 seats within the inner housing 54 and extends through the inner housing 54. As best shown in FIG. 7, the ring valve 26 is formed from a cylindrical wall 98 having first and second ends 98a, 98b and a central passageway 100 therethrough. The wall 98 has an exterior surface which has a first unthreaded portion 102 extending from the first end 98a, a second unthreaded portion 104 extending from the second end 98b, and a central threaded section 106 extending between the first and second unthreaded portions 102, 104. The second unthreaded portion 104 has a groove 108 formed therein which has a plurality of spaced apart teeth 110 provided therein. The central passageway 100 has a first section 100a which extends from the first end 98a of the wall 98 to a second section 100b that extends to the second end 98b of the wall 98. The first section 100a tapers inwardly from its first end to its second end. The second section 100b tapers outwardly from its first end to its second end. The first section 100a has a plurality of grooves 112 provided therein.

Figure 8:
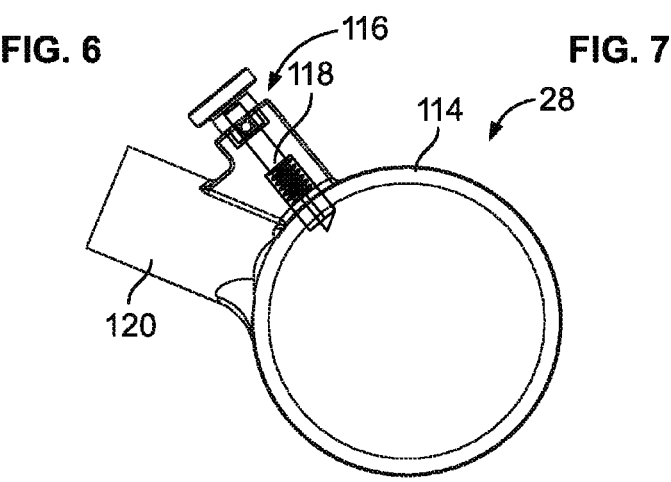
FIG. 8 is a side elevation view of a ratchet assembly of the deboning machine.

The ratchet assembly 28 attaches to the ring valve 26 and is used to seat the ring valve 26 into the inner housing 54. As best shown in FIG. 8, the ratchet assembly 28 is formed from a cylindrical wall 114 having a ratchet mechanism 116 provided thereon. The ratchet mechanism 116 may take the form of a spring-loaded pin 118 which extends through the wall 114. The pin 118 engages the teeth 110 on the ring valve 26. A tube 120 extends outwardly from the wall 114 proximate to the ratchet mechanism 116. A tool (not shown) can be inserted into the tube 120 to rotate the ratchet assembly 28 and the ring valve 26 relative to the inner housing 54 in a known manner. When the ring valve 26 is fully seated in the inner housing 54, the threaded portion 106 engages with the threaded section 96b of the inner housing 54. The first unthreaded section 102 seats within the unthreaded section 96a of the inner housing 54 and extends outwardly therefrom. The second unthreaded section 104 extends outwardly from the second end 94b of the inner housing 54. The ratchet assembly 28 is proximate to the second end 94b of the inner housing 54 and the ratchet mechanism 116 and tube 120 extend between the legs 64 the outer housing 52.

The separation chamber 24 is typically of machined heavy duty steel for withstanding the high pressures associated with the deboning operation. As best shown in FIGS. 9A-D and 10, the separation chamber 24 is formed from a frusto-conical wall 122 having a first end 122a and a second opposite end 122b. A first ring 124 extends outwardly from the wall 122 proximate to the first end 122a, and a second ring 126 extends outwardly from the wall 122 proximate to the second end 122b. A central passageway 128 extends through the wall 122. A central axis 130 is defined through the wall 122. The central passageway 128 has a first section 128a which extends from the first end 122a of the wall 122 to a second section 128b which terminates at the second end 122b of the wall 122. The first section 128a is formed from a conical wall and the second section 128b is formed from a wall which is parallel to the central axis 130.

The wall 122 has a first cylindrical section 127 between the first end 122a and the first ring 124 and a second tapered section 131 between the rings 124, 126. The first section 127 has a pair of diametrically opposed flat surfaces 129 provided on the exterior surface thereof. The flat surfaces 129 are parallel to the central axis 130. The second section 131 has a plurality of perforations provided therethrough which extend between radial inner and outer surfaces of the wall 122, and present a plurality of sharp arcuate edges.

Figure 10:
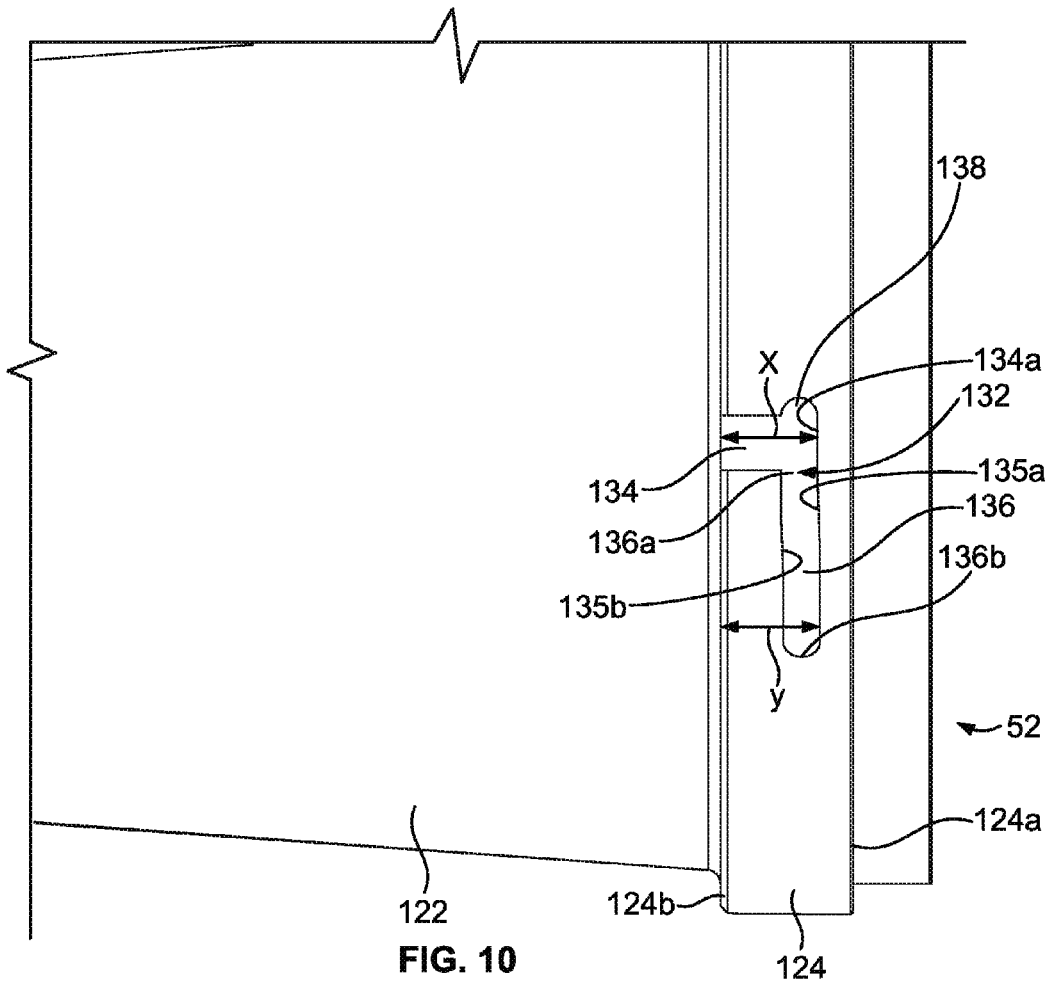
FIG. 10 is an enlarged side elevation view of a portion of the separation chamber.

A pair of diametrically opposed pockets 132 are formed in the first ring 124. As best shown in FIG. 10, each pocket 132 has an entry section 134 which extends a predetermined distance from a second end 124b of the ring 124 toward a first end 124a of the ring 124 and terminates in an end surface 134a. Each entry section 134 is parallel to the central axis 130. Each pocket 132 further has a cam section 136 which extends generally perpendicular to the entry section 134. A first end 136a of the cam section 136 extends from the entry section 134, and the cam section 134 terminates at a second opposite end 136b. The cam section 134 is defined by first and second side surfaces 135a, 135b and the end 136b. The cam section 134 is angled relative to a line transverse to the central axis 130, such that the distance X (the distance X is defined between the end surface 134a and the second end 124b of the ring 124) is less than the distance Y (the distance Y is defined between the side surface 135a and the second end 124b of the ring 124) to provide for a camming action as described herein. An overhang section 138 is provided proximate to the entry section 134 and aligns with the cam section 136. The overhang section 138 may be eliminated.

As shown in FIGS. 9A and 9B, a pair of diametrically opposed elongated slots 140 are provided through the second ring 126 and the wall 122. The slots 140 extend transverse to the central axis 130. The respective pockets 132 and slots 140 axially align with each other.

The separation chamber 24 seats within the sections 66a-66d of the central passageway 66 of the outer housing 52 and the second end 122b abuts against the first end 94a of the inner housing 54. The first cylindrical section 127 is spaced from the first ring 56 such that a space 133 is formed around the circumference of the first cylindrical section 127. The slots 140 align with the through holes 84 in the outer housing 52 and the pockets 132 align with the through holes 74 in the outer housing 52. A pin 142 seats within each through hole 84 and the respective slot 140 for reasons described herein. A pin 144 seats within each through hole 74 and the respective pocket 132 for reasons described herein.

The auger assembly 30 includes the auger 34, the bushing 36 and the jam nut 38.

Figure 11:
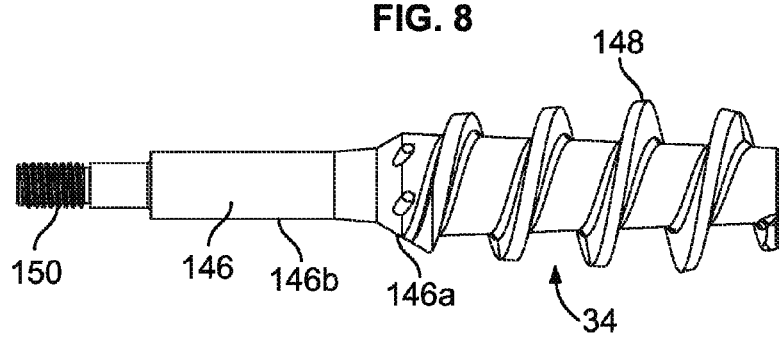
FIG. 11 is a side elevation view of an auger of the deboning machine.
Figure 12:
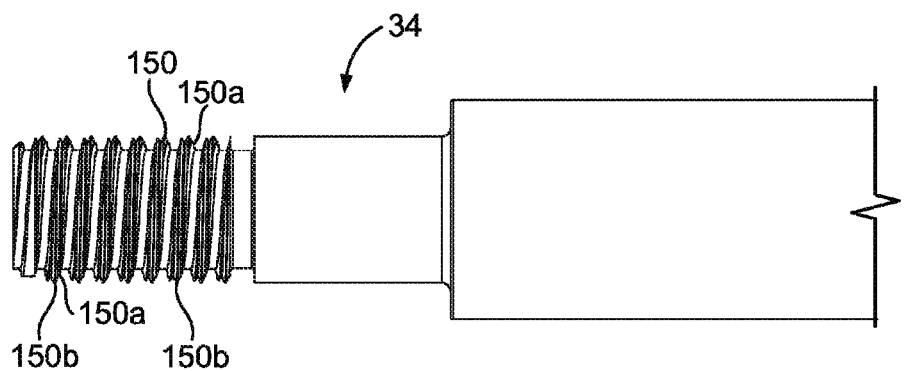
FIG. 12 is a side elevation view of a portion of the auger.

The auger 34 is best shown in FIGS. 11 and 12. The auger 34 is formed of an elongated unthreaded shaft 146 having a screw form 148 at one end thereof and a fine thread form 150 at the other end thereof. The shaft 146 includes a tapered section 146a which extends from the screw form 148 and tapers inwardly to a generally cylindrical section 146b which extends between the tapered section 146a and the fine thread form 150. At the end with the screw form 148, a pocket 152 is provided into which a tool can be inserted to rotate the auger 34. The fine thread form 150 includes an acme thread 150a, which is preferably 1.5×4 pitch, with a V thread 150b, which is preferably 1.5×12 pitch, running over the acme thread 150a.

Figure 13:
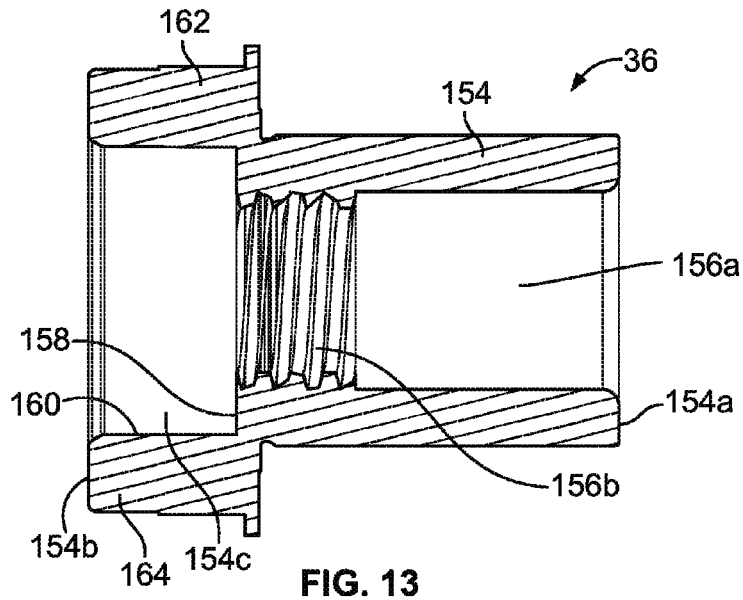
FIG. 13 is a cross-sectional view of a bushing of the deboning machine.

The bushing 36, as shown in FIG. 13, is formed of a wall 154 having first and second ends 154a, 154b and a central passageway 156 therethrough. The central passageway 156 has a first unthreaded section 156a extending from the first end 154a toward the second end 154b, a second threaded section 156b extending from the first section 154a and which has an outer diameter equal to the diameter of the first section 154a, and a third unthreaded section 154c which extends from the second section 154b to the second end 154b and which has a diameter greater than the first and second sections 154a, 154b. The third section 154c is formed from an end wall 158 which is perpendicular to the walls forming the first and second sections 156a, 156b and a side wall 160 which is perpendicular to the end wall 158. A ring 162 extends outwardly from the wall 154. The ring 162 has a gripping portion 164 for a user to grasp the bushing 36.

Figure 14:
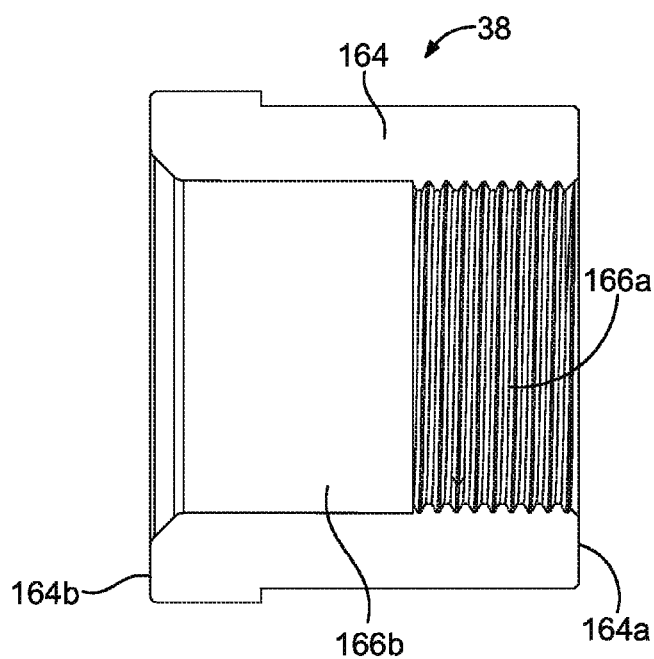
FIG. 14 is a cross-sectional view of a jam nut of the deboning machine.

As shown in FIG. 14, the jam nut 38 is formed of a wall 164 having first and second ends 164a, 164b and a central passageway 166 therethrough. The central passageway 166 has a first threaded section 166a extending from the first end 164a toward the second end 164b and a second unthreaded section 166b extending from the first section 166a to the second end 164b. The second section 166b has an outer diameter equal to the diameter of the first section 166a. A ring 168 extends from the wall 164 proximate to the second end 164b and has a gripping surface provided thereon to allow a user to grasp the jam nut 38.

In use, the bushing 36 is threaded onto the fine thread form 150 on the second end of the auger 34. Thereafter, the jam nut 38 is threaded onto the fine thread form 150 on the second end of the auger 34 and seats in third section 154c of the bushing 36.

Figure 2:
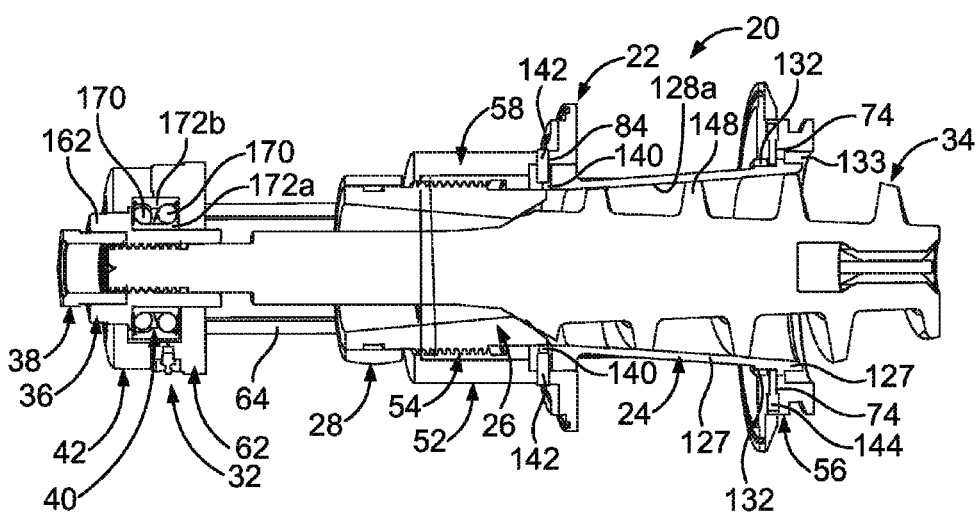
FIG. 2 is a cross-sectional view of the deboning machine.
Figure 15:
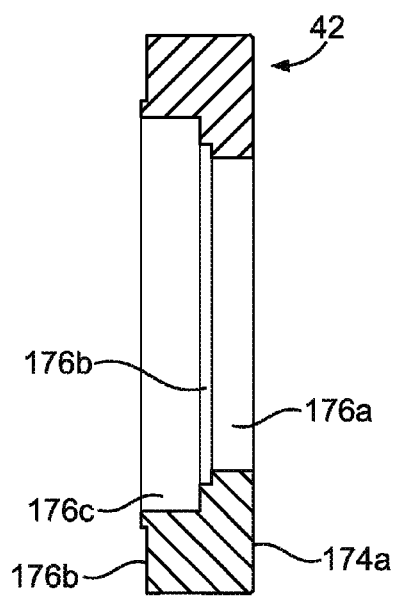
FIG. 15 is a cross-sectional view of an end plate of the deboning machine.
Figure 16A:
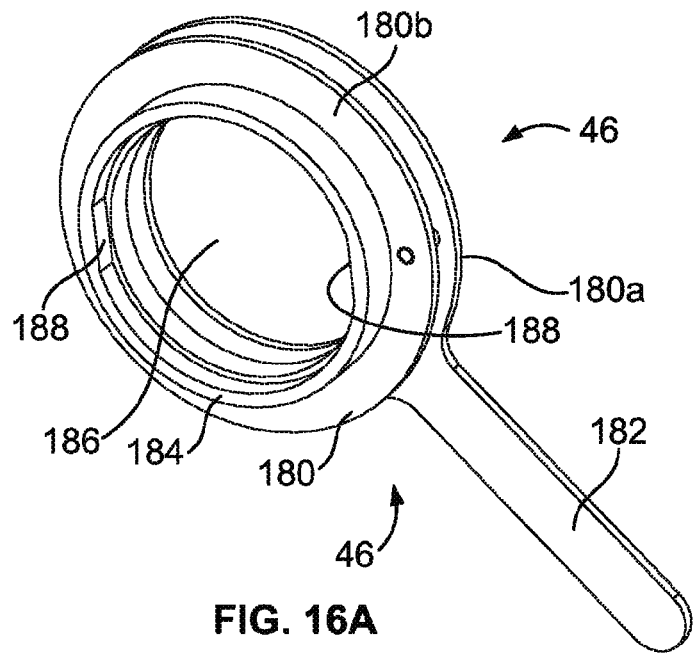
FIG. 16A is a perspective view of the tool.
Figure 16B:
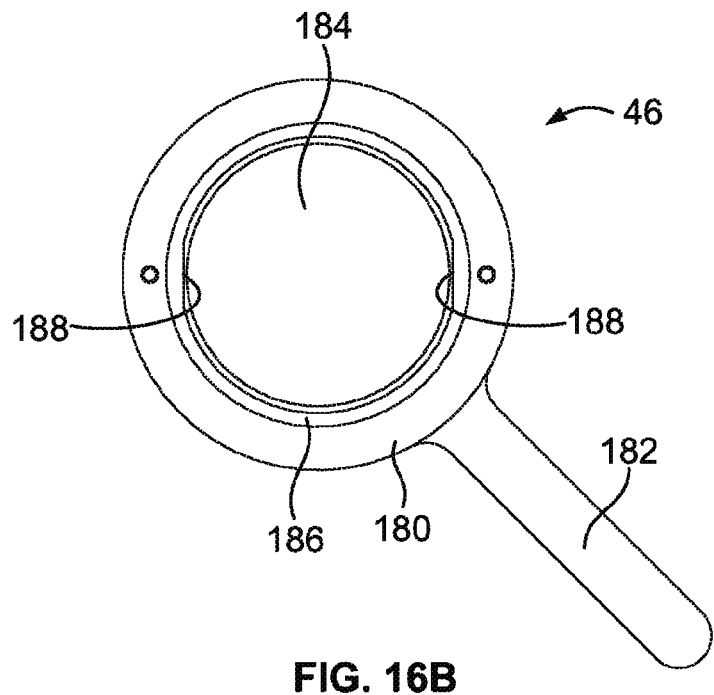
FIG. 16B is an end view of the tool.
Figure 17:
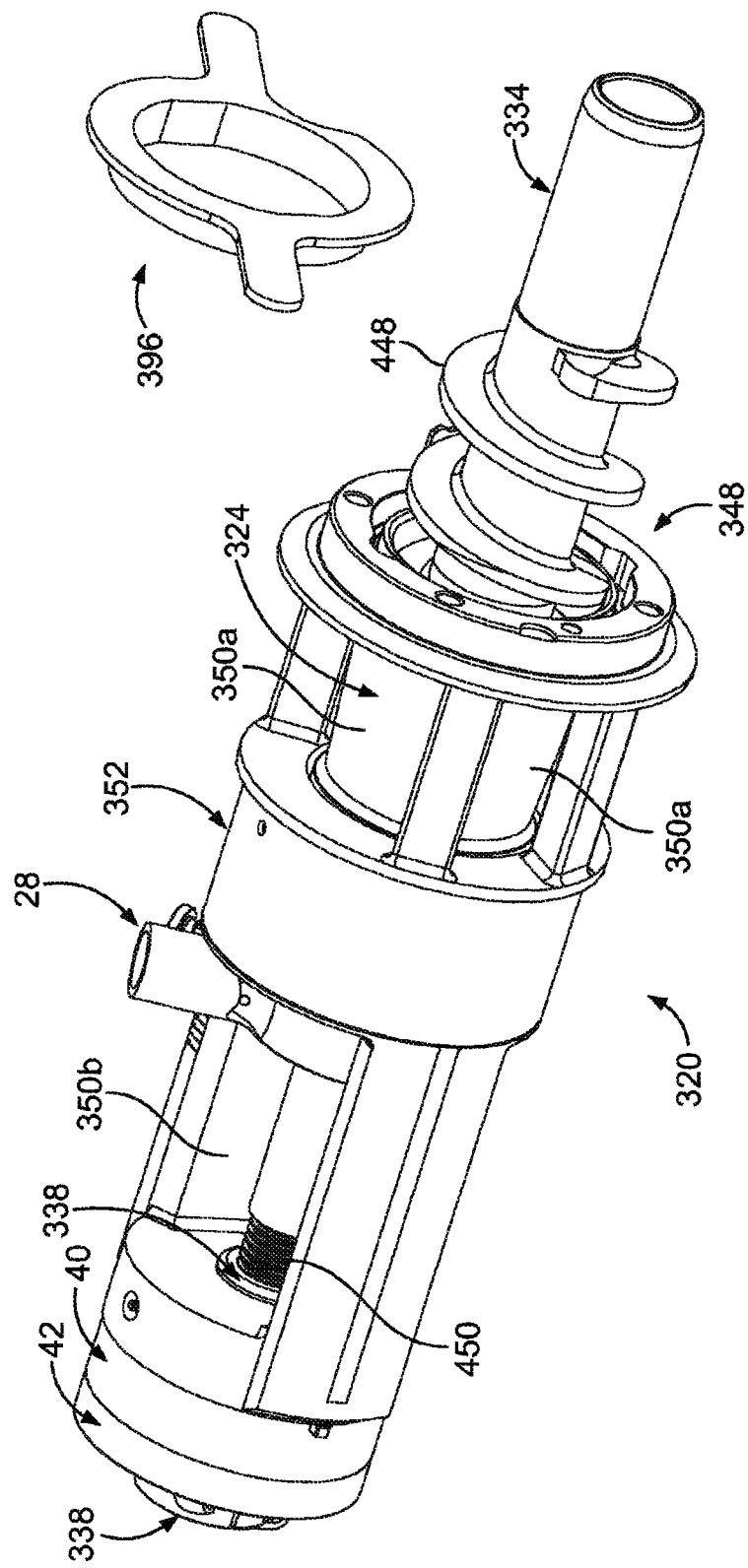
FIG. 17 is a perspective view of a deboning machine and a tool used to assemble the deboning machine, the deboning machine incorporating the features of a second embodiment.
Figure 18:
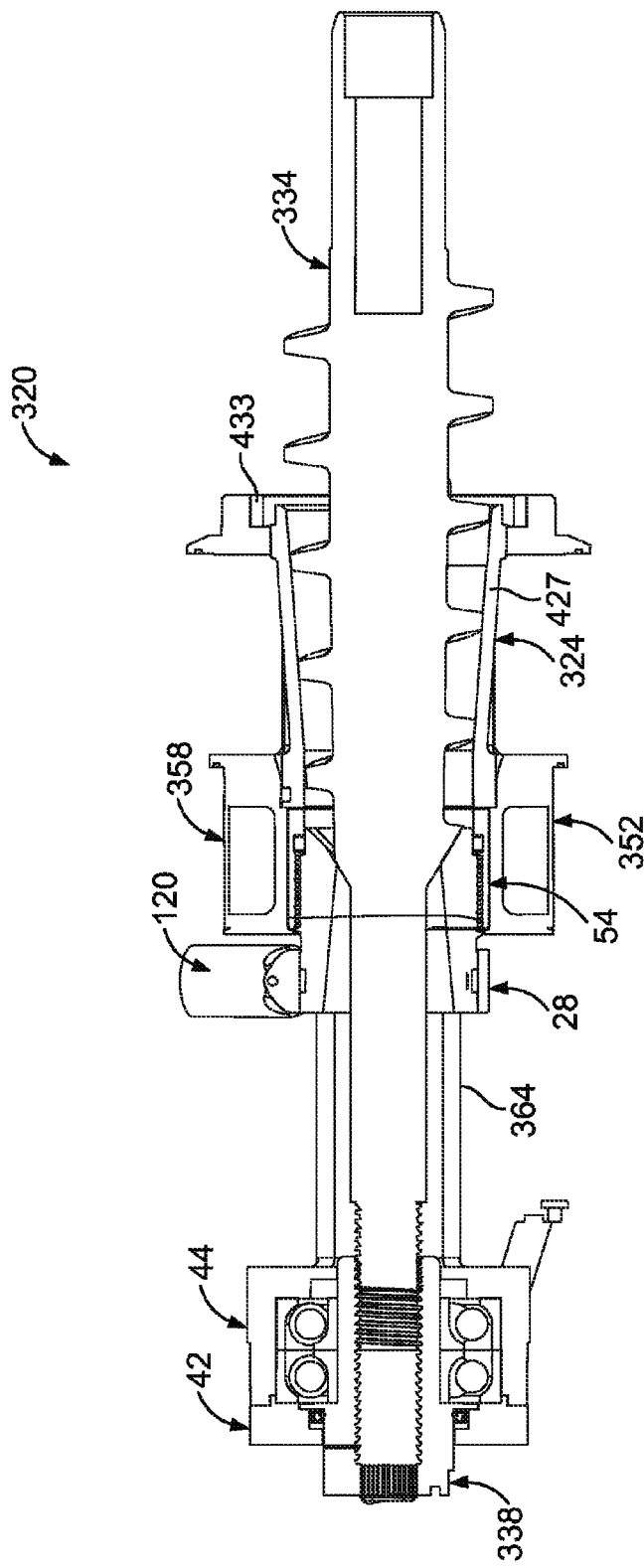
FIG. 18 is a cross-sectional view of the deboning machine of FIG. 17.

The bearing assembly 32 includes the bearing 40, the end plate 42 and fasteners for connecting the end plate 42 to the outer housing 52. The bearing 40, see FIGS. 2 and 3, is a typical two-part bearing 40 having a plurality of balls 170 provided between the parts 172a, 172b. The end plate 42, see FIGS. 3 and 15, is formed of a wall 174 having first and second ends 174a, 174b and a central passageway 176 therethrough. The central passageway 176 has a first unthreaded section 176a extending from the first end 174a toward the second end 174b, a second unthreaded section 176b extending from the first section 176a to a third section 176c which extends to the second end 174b. The first section 176a has a diameter which is smaller than the second section 176b; the second section 176b has a diameter which is smaller than the third section 176c. A plurality of through holes 178 are formed through the wall 174 for accepting the fasteners 44 therethrough.

The wrench 46, see FIGS. 1, 3, 16A and 16B, has a circular body 180 having first and second side 180a, 180b, a handle 182 extending from the periphery of body 180, and a circular flange 184 extending from the second side 180b of the body 180. A central circular passageway 186 extends through the center of the body 180 and the flange 184. The flange 184 is smaller in diameter than the body 180. A pair of diametrically opposed flats 188 are provided on the internal surface of the flange 184.

Now that the components of the deboning machine 20 have been described, the method of assembling the deboning machine 20 is described.

The ring valve 26 is threaded into engagement with the inner housing 54. The joined inner housing 54/ring valve 26 are inserted through the first ring 56 of the outer housing 52 and are seated within the second section 66e in the second ring 58 of the outer housing 52. The unthreaded portion 98 of the ring valve 26 extends into section 66d. The unthreaded portion 104 of the ring valve 26 extends through section 66f and outwardly from the second ring 58 into section 66g.

The ratchet assembly 28 is inserted between the legs 64 into section 66g of the outer housing 52 and is slid over the second end 98b of the ring valve 26. The ratchet assembly 28 seats over the groove 108 on the ring valve 26 such that the ratchet mechanism 116 engages with the teeth 110. The ratchet mechanism 116 and the tube 120 extend outwardly between the legs 64 of the outer housing 52.

The separation chamber 24 is then inserted through the first ring 56 of the outer housing 52 and seats within the sections 66a-66d of the central passageway 66 of the outer housing 52. As separation chamber 24 is advanced axially, the pins 142 enter into slots 140 and the pins 144 enter into the entry section 134 of the pockets 132. As separation chamber 24 is further advanced axially, the pins 144 slide along the entry section 134 until the pins 144 abut against the end surface 134a of the pockets 132. At this point in the assembly, the separation chamber 24 cannot be advanced further in the axial direction and a predefined space is provided between the separation chamber 24 and the first end 94a of the inner housing 54. The first end 98a of the ring valve 98 seats within the second end 122b of the separation chamber 24. The first cylindrical section 127 of the separation chamber 24 is spaced from the first ring 56 such that the space 133 is formed around the circumference of the first cylindrical section 127.

The end of the auger 34 with the fine thread form 150 is then inserted through the first ring 56, through the separation chamber 24, through the ring valve 26, and through the third ring 62 of the outer housing 52. The screw form 148 of the auger 34 abuts against the first conical section 128a of the wall 128 of the separation chamber 24.

The bearing 40 is slid over the wall 154 of the bushing 36 and abuts against the ring 162. The bushing 36 is then threaded onto the thread form 150 of the auger 34 until the bearing 40 abuts against the third ring 62 of the outer housing 52. To effect this threading, the bushing 36 threads into engagement with the acme thread form 150a which allows for the rapid threading of the bushing with the auger 34. The end plate 42 is slid over the bushing 36 and the bearing 40 and is attached to the outer housing 52 by the fasteners 44 which extend through the end plate 42 and into the blind bores in the second end 52b of the outer housing 54. The jam nut 38 is attached to the thread form 150 of the auger 34 and seats within the bushing 36 to complete the initial assembly. To effect this threading, the jam nut 38 threads into engagement with the V thread 150b to provide the jamming action between the jam nut 38 and the auger 34.

The order of assembly can be modified from that described provided the final configuration is achieved.

When the auger 34 is in its initial position, the outwardmost ends of the screw thread form 148 contacts the surface of the first conical section 128a of the separation chamber 24, thus preventing movement of the auger 34 relative to the separation chamber 24. This abutting engagement is commonly termed "bottoming out" of the auger 34 relative to the separation chamber 24. The auger 34 can no longer be advanced in the lateral direction due to the contact between the auger 34 and the first conical section 128a of the separation chamber 24. As a result, in this condition, the deboning machine 20 is not configured for operation as a working space must be provided between the auger 34 and the separation chamber 24.

To provide the working space, the separation chamber 24 is rotated relative to the remainder of the deboning machine 20. To do this, the wrench 46 is inserted over the screw thread form 148 and the flange 184 is inserted into the space 133 between the first cylindrical section 127 of the separation chamber 24 and the first ring 56. The flats 188 on the wrench 46 engage with the flats 129 on the separation chamber 24. The wrench 46 is rotated, thus rotating the separation chamber 24 relative to the remainder of the deboning machine 20 which is held fixed in place. Slight counter-directional rotation of the separation chamber 24 allows the auger 34 to be disengaged from the separation chamber 24. During rotation of the separation chamber 24, the pins 144 travel along the cam sections 136 of the pockets 132, and the pins 142 travel along the slots 140. This causes the separation chamber 24 to move a small distance away from the auger 34 and towards the ring valve 26 and the inner housing 54, thereby forming the working space, thus allowing the auger assembly 30 to freely rotate relative to the separation chamber 24, while still being retained in the housing 22. The cam sections 136 of the pockets 132 are dimensioned so that the separation chamber 24 is only moved 0.0016" toward the ring valve 26. Accurate and controllable spacing between the auger 34 and the separation chamber 24 is necessary to attain proper or desired processing of the raw materials to attain a desired finish material content and consistency. Accurate and controllable spacing also reduces premature and/or undesired wear of the auger 34 and/or the separation chamber 24, with such wear being attributable to improper spacing between the auger 34 and the separation chamber 24. Alternatively, the rotation of the separation chamber 34 relative to the remainder of the deboning machine 20 can be effected by attaching the deboning machine 20 to the meat feeding machine (not shown).

In use, bone connected meat is fed into the feed end 48 of the deboning machine 20. Rotation of the auger 34 moves meat and bone material through the separation chamber 24. Meat is separated from the bone material by passing radially through the perforations in the separation chamber 24 and through the meat discharge ports 50a. The remaining bone material is dispelled from the deboning machine 20 through bone discharge ports 50b.

Figure 19:
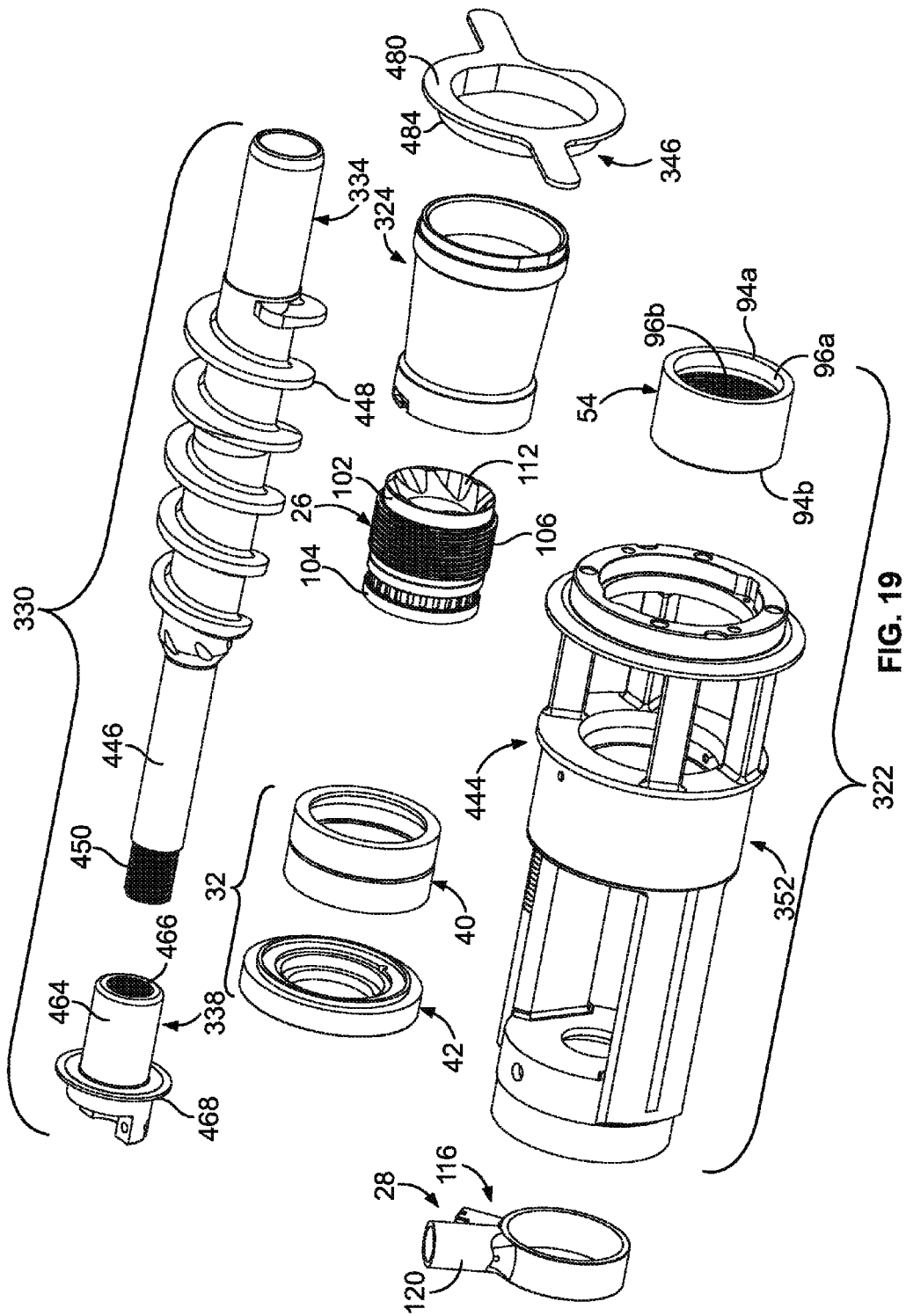
FIG. 19 is an exploded perspective view of the deboning machine and tool of FIG. 17.

Attention is invited to the second embodiment of the deboning machine 320 shown in FIGS. 17-24B. The deboning machine 320 includes a housing 322 into which a separation chamber 324, a ring valve 26, a ratchet assembly 28, an auger assembly 330 and a bearing assembly 32 are mounted. As best shown in FIG. 19, the auger assembly 330 includes an auger 334 and a nut 338. The ring valve 26, the ratchet assembly 28 and the bearing assembly 32 are identical to that of the first embodiment and the specifics are not repeated herein. A tool, such as wrench 346, is used to assemble the deboning machine 320 by rotating the separation chamber 324 relative to the auger assembly 330. As with the first embodiment, this is contrary to prior art methods where the auger is rotated relative to the separation chamber. In use, bone connected meat is feed into the deboning machine 320 at feed end 348, meat is expelled from the deboning machine 320 through meat discharge ports 350a and bone is expelled from the deboning machine 320 through bone discharge ports 350b.

The housing 322 is formed of an outer housing 352 and an inner housing 54. The inner housing 54 is identical to the inner housing 54 of the first embodiment and is mounted within the outer housing 352. The specifics of the inner housing 54 are not repeated herein.

Figure 20:
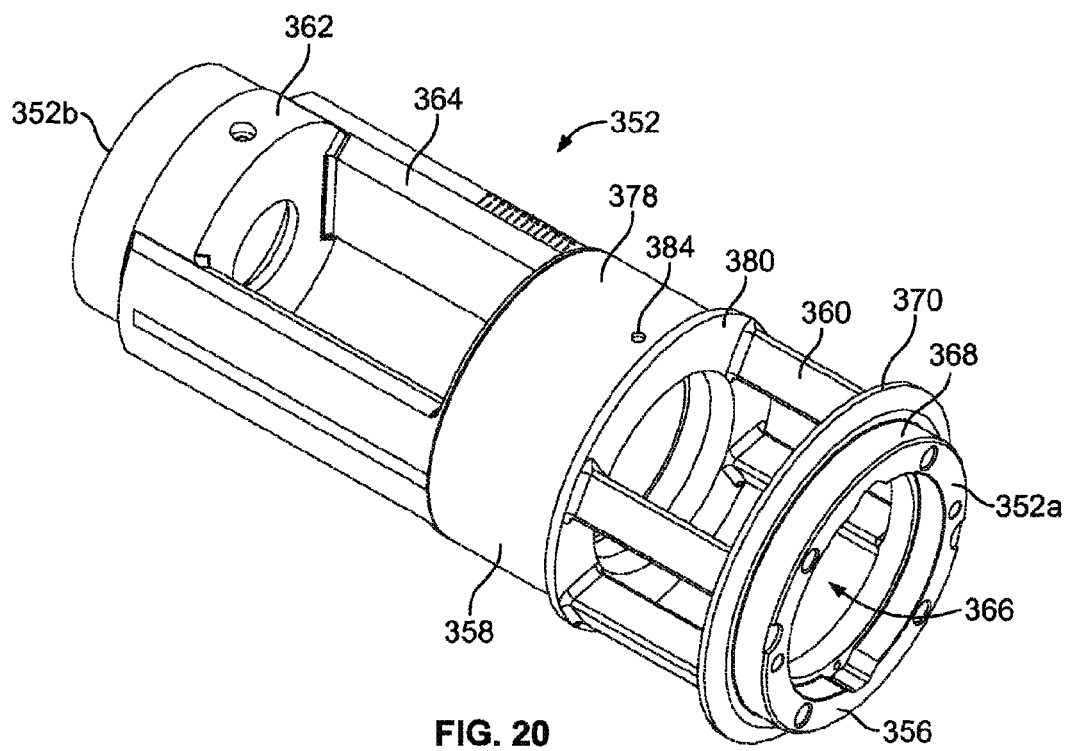
FIG. 20 is a perspective view of an outer housing of the deboning machine of FIG. 17.
Figure 21:
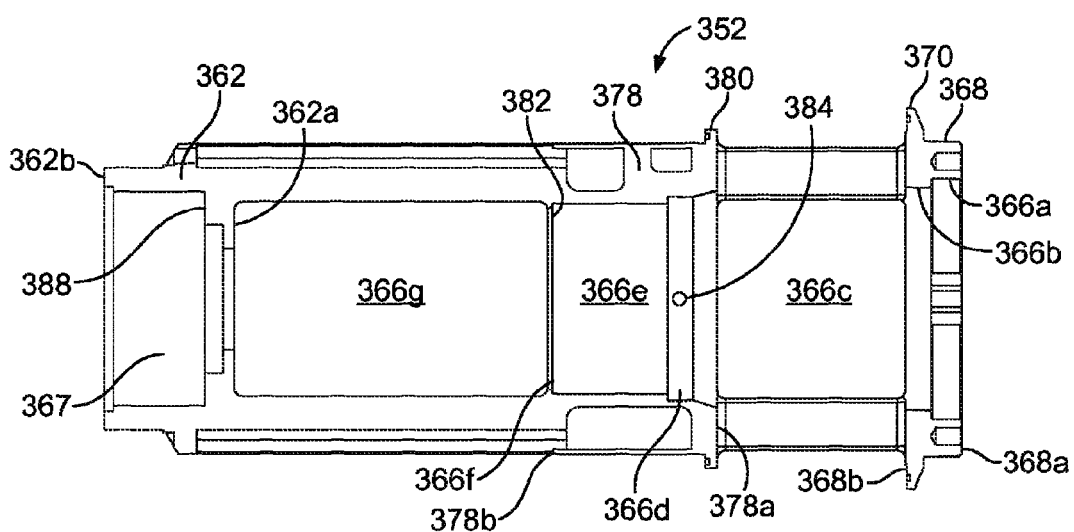
FIG. 21 is a cross-sectional view of the outer housing of FIG. 20.

As shown in FIGS. 20 and 21, the outer housing 352 includes a first ring 356 which is connected to a second ring 358 by a plurality of spaced apart legs 360, and a third ring 362 which is connected to the second ring 358 by a pair of spaced apart legs 364. A central passageway 366 is formed through the outer housing 352 and extends from a first end 352a of the outer housing 352 to a second end 352b of the outer housing 352. When the deboning machine 320 is assembled as discussed herein, the spaces between the legs 360 form the meat discharge ports 350a and the spaces between the legs 364 form the bone discharge ports 350b.

The first ring 356 is formed from a cylindrical wall 368 from which a circular flange 370 extends outwardly therefrom. The wall 368 has a first end 368a and a second opposite end 368b. The flange 370 extends outwardly from the wall 368 proximate to the second end 368b. An interior surface of the wall 368 defines a portion of the central passageway 366. The portion of the central passageway 366 through the first ring 356 has a first larger diameter section 366a which extends from the first end 368a toward the second end 368b, and a second smaller diameter section 366b which extends from the first section 366a to the second end 368b.

The legs 360 are spaced apart from each other such that spaces are provided therebetween which form meat discharge ports 350a. The meat discharge ports 350a allow for the meat separated from the bone connected meat to exit the deboning machine 320 as described herein. The area between the legs 360 forms a section 366c of the central passageway 366 which is in axial alignment with the sections 366a, 366b in the first ring 356. The section 366c has a diameter which is smaller than the diameter of section 366b.

The second ring 358 is formed from a cylindrical wall 378 from which a circular flange 380 extends outwardly therefrom. The wall 378 has a first end 378a and a second opposite end 378b. The flange 380 extends outwardly from the wall 378 proximate to the first end 378a. An interior surface of the wall 378 defines a portion of the central passageway 366. The portion of the central passageway 366 through the second ring 358 has a first larger diameter section 366d which extends from the first end 378a toward the second end 378b, a second smaller diameter section 366e which extends from the first section 366d to a third smaller diameter section 366f. The third section 366f terminates the second end 378b of the wall 378. The first section 366d has a diameter which is smaller than the diameter of the section 366b through the first ring 356 and which is larger than the diameter of the second section 366e. The second section 366e has a diameter which is greater than the third section 366f, such that a shoulder 382 is formed by the portion of the wall 378 forming the third section 366f. The sections 366d-366f are in axial alignment with the sections 366a-366c. A pair of diametrically opposed through holes 384 are provided through the wall 378 proximate to the first end 378a.

The legs 364 are spaced apart from each other such that spaces are provided therebetween which form bone discharge ports 350b. The bone discharge ports 350b allow for bone separated from the bone connected meat to exit the deboning machine 320 as described herein. The area between the legs 364 forms a section 366g of the central passageway 366 which is in axial alignment with the sections 366a-366f. The section 366g has a diameter which is smaller than the diameter of section 366f.

The third ring 362 is formed from a cylindrical wall having a first end 362a and a second opposite end 362b. An interior surface of the third ring 362 defines a section 367 of the central passageway 366 which has varying diameters and in which a shoulder 388 is formed. The section 367 is in axial alignment with the sections 366a-366g. A plurality of bind bores are provided in the second end 362b of the third ring 362.

The ring valve 26 seats within the inner housing 54 and extends through the inner housing 54. The ratchet assembly 28 attaches to the ring valve 26 and is used to seat the ring valve 26 into the inner housing 54. A tool (not shown) can be inserted into the tube 120 to rotate the ratchet assembly 28 and the ring valve 26 relative to the inner housing 54 in a known manner. When the ring valve 26 is fully seated in the inner housing 54, the threaded portion 106 engages with the threaded section 96b of the inner housing 54. The first unthreaded section 102 seats within the unthreaded section 96a of the inner housing 54 and extends outwardly therefrom. The second unthreaded section 104 extends outwardly from the second end 94b of the inner housing 54. The ratchet assembly 28 is proximate to the second end 94b of the inner housing 54 and the ratchet mechanism 116 and tube 120 extend between the legs 364 the outer housing 352.

The separation chamber 324 is typically of machined heavy duty steel for withstanding the high pressures associated with the deboning operation. As best shown in FIGS. 22A-D, the separation chamber 324 is formed from a frusto-conical wall 422 having a first end 422a and a second opposite end 422b. A first ring 424 extends outwardly from the wall 422 proximate to the first end 422a, and a second ring 426 extends outwardly from the wall 422 proximate to the second end 422b. A central passageway 428 extends through the wall 422. A central axis 430 is defined through the wall 422. The central passageway 428 has a first section 428a which extends from the first end 422a of the wall 422 to a second section 428b which terminates at the second end 422b of the wall 422. The first section 428a is formed from a conical wall and the second section 428b is formed from a wall which is parallel to the central axis 430.

The wall 422 has a first cylindrical section 427 between the first end 422a and the first ring 424 and a second tapered section 431 between the rings 424, 426. The first section 427 has a pair of diametrically opposed flat surfaces 429 provided on the exterior surface thereof. The flat surfaces 429 are parallel to the central axis 430. The second section 431 has a plurality of perforations provided therethrough which extend between radial inner and outer surfaces of the wall 422, and present a plurality of sharp arcuate edges.

Figure 23:
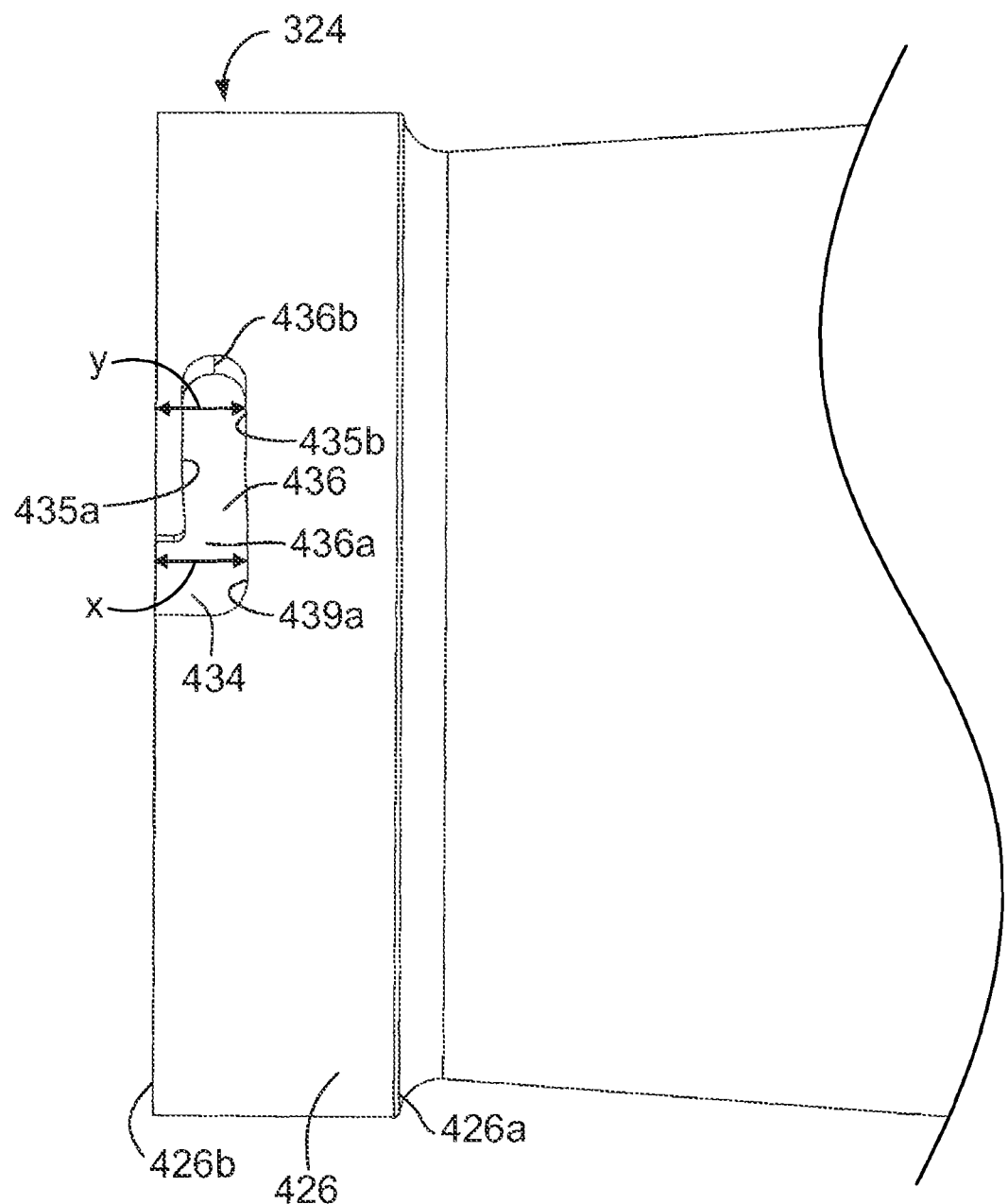
FIG. 23 is an enlarged side elevation view of a portion of the separation chamber of FIG. 22A.

A pair of diametrically opposed pockets 432 are formed in the second ring 426. As best shown in FIG. 23, each pocket 432 has an entry section 434 which extends a predetermined distance from a second end 426b of the ring 426 toward a first end 426a of the ring 426 and terminates in an end surface 434a. Each entry section 434 is parallel to the central axis 430. Each pocket 432 further has a cam section 436 which extends generally perpendicular to the entry section 434. A first end 436a of the cam section 436 extends from the entry section 434, and the cam section 434 terminates at a second opposite end 436b. The cam section 434 is defined by first and second side surfaces 435a, 435b and the end 436b. The cam section 434 is angled relative to a line transverse to the central axis 430, such that the distance X (the distance X is defined between the end surface 434a and the second end 426b of the ring 426) is less than the distance Y (the distance Y is defined between the side surface 435a and the second end 426b of the ring 426) to provide for a camming action as described herein.

The separation chamber 324 seats within the sections 366a-366d of the central passageway 366 of the outer housing 352 and the second end 422b abuts against the first end 394a of the inner housing 354. The first cylindrical section 427 is spaced from the first ring 356 such that a space 433 is formed around the circumference of the first cylindrical section 427. The pockets 432 align with the through holes 384 in the outer housing 352. A pin 444 seats within each through hole 384 and the respective pocket 432 for reasons described herein.

The auger assembly 330 includes the auger 334 and the nut 338. The auger 334 is identical to that the first embodiment, except that the thread form 150 only includes an acme thread. Identical reference numerals are used for the remainder of the components of the auger 334. The nut 338 is formed of a wall 464 having a threaded central passageway 466 therethrough. A ring 468 extends from the wall 464 proximate to a second end and has a gripping surface provided thereon to allow a user to grasp the nut 338. In use, the nut 338 is threaded onto the thread form 450 on the second end of the auger 334.

Figure 24A:
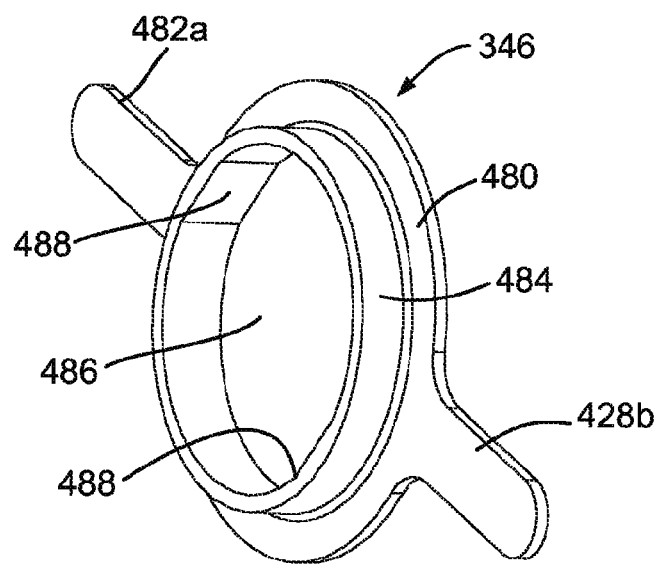
FIG. 24A is a perspective view of the tool of FIG. 17.
Figure 24B:
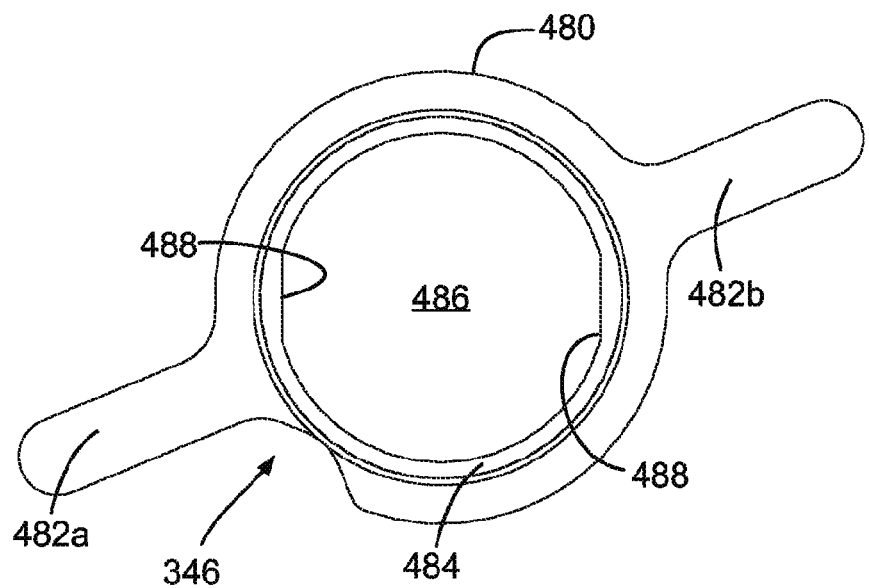
FIG. 24B is an end view of the tool of FIG. 24B.

The wrench 346, see FIGS. 24A and 24B, has a circular body 480 having first and second handle 482a, 482b extending from the periphery of body 480, and a circular flange 484 extending from the body 480. A central passageway 486 extends through the center of the body 480 and the flange 484. The flange 484 is smaller in diameter than the body 480. A pair of diametrically opposed flats 488 are provided on the internal surface of the flange 184.

Now that the components of the deboning machine 320 have been described, the method of assembling the deboning machine 320 is described.

The ring valve 26 is threaded into engagement with the inner housing 54. The joined inner housing 54/ring valve 26 are inserted through the first ring 356 of the outer housing 352 and are seated within the second section 366e in the second ring 358 of the outer housing 352. The unthreaded portion 98 of the ring valve 26 extends into section 366d. The unthreaded portion 104 of the ring valve 26 extends through section 366f and outwardly from the second ring 358 into section 366g.

The ratchet assembly 28 is inserted between the legs 364 into section 366g of the outer housing 52 and is slid over the second end 98b of the ring valve 26. The ratchet assembly 28 seats over the groove 108 on the ring valve 26 such that the ratchet mechanism 116 engages with the teeth 110. The ratchet mechanism 116 and the tube 120 extend outwardly between the legs 364 of the outer housing 352.

The separation chamber 324 is then inserted through the first ring 356 of the outer housing 352 and seats within the sections 366a-366d of the central passageway 366 of the outer housing 352. As separation chamber 324 is advanced axially, the pins 444 enter into the entry section 434 of the pockets 432. As separation chamber 324 is further advanced axially, the pins 444 slide along the entry section 434 until the pins 444 abut against the end surface 434a of the pockets 432. At this point in the assembly, the separation chamber 324 cannot be advanced further in the axial direction and a predefined space is provided between the separation chamber 324 and the first end 394a of the inner housing 354. The first end 98a of the ring valve 98 seats within the second end 422b of the separation chamber 24. The first cylindrical section 427 of the separation chamber 324 is spaced from the first ring 356 such that the space 433 is formed around the circumference of the first cylindrical section 427.

The end of the auger 334 with the thread form 450 is then inserted through the first ring 356, through the separation chamber 324, through the ring valve 26, and through the third ring 362 of the outer housing 352. The screw form 448 of the auger 334 abuts against the first conical section 428a of the wall 428 of the separation chamber 324.

The end plate 42 is slid over the wall 464 of nut 338 and abuts against ring 468. The bearing 40 is slid over the wall 464 of nut 338 and abuts against end plate 42. The end plate 42 is attached to the outer housing 352 by the fasteners which extend through the end plate 42 and into the blind bores in the second end 352b of the outer housing 354. The nut 338 is threaded onto the thread form 450 of the auger 334 until the bearing 40 abuts against the third ring 362 of the outer housing 352.

The order of assembly can be modified from that described provided the final configuration is achieved.

When the auger 334 is in its initial position, the outwardmost ends of the screw thread form 448 contacts the surface of the first conical section 428a of the separation chamber 324, thus preventing movement of the auger 334 relative to the separation chamber 324. This abutting engagement is commonly termed "bottoming out" of the auger 334 relative to the separation chamber 324. The auger 334 can no longer be advanced in the lateral direction due to the contact between the auger 334 and the first conical section 428a of the separation chamber 324. As a result, in this condition, the deboning machine 320 is not configured for operation as a working space must be provided between the auger 334 and the separation chamber 324.

To provide the working space, the separation chamber 324 is rotated relative to the remainder of the deboning machine 320. To do this, the wrench 346 is inserted over the screw thread form 448 and the flange 484 is inserted into the space 433 between the first cylindrical section 427 of the separation chamber 324 and the first ring 356. The flats 488 on the wrench 346 engage with the flats 429 on the separation chamber 324. The wrench 346 is rotated, thus rotating the separation chamber 324 relative to the remainder of the deboning machine 320 which is held fixed in place. Slight counterdirectional rotation of the separation chamber 324 allows the auger 334 to be disengaged from the separation chamber 324. During rotation of the separation chamber 324, the pins 444 travel along the cam sections 436 of the pockets 432. This causes the separation chamber 324 to move a small distance away from the auger 334 and towards the ring valve 26 and the inner housing 354, thereby forming the working space, thus allowing the auger assembly 330 to freely rotate relative to the separation chamber 324, while still being retained in the housing 322. The cam sections 436 of the pockets 432 are dimensioned so that the separation chamber 324 is only moved 0.0016" toward the ring valve 26. Accurate and controllable spacing between the auger 334 and the separation chamber 324 is necessary to attain proper or desired processing of the raw materials to attain a desired finish material content and consistency. Accurate and controllable spacing also reduces premature and/or undesired wear of the auger 334 and/or the separation chamber 324, with such wear being attributable to improper spacing between the auger 334 and the separation chamber 324. Alternatively, the rotation of the separation chamber 334 relative to the remainder of the deboning machine 320 can be effected by attaching the deboning machine 320 to the meat feeding machine (not shown).

In use, bone connected meat is fed into the feed end 348 of the deboning machine 320. Rotation of the auger 334 moves meat and bone material through the separation chamber 324. Meat is separated from the bone material by passing radially through the perforations in the separation chamber 324 and through the meat discharge ports 350a. The remaining bone material is dispelled from the deboning machine 320 through bone discharge ports 350b.

In each embodiment, the ring valve 26 creates a back pressure to provide a choke for controlling pressure within the separation chamber 24, 324, thereby controlling extrusion through the perforations of the separation chamber 24, 324 of the separated meat. It is further appreciated that the perforations associated with the separation chamber 24, 324 can be manipulated to be provided in different patterns, sizes, shapes, and/or frequency to provide variable operating pressures along a longitudinal length of the separation chamber 24, 324 and to alter the separation performance of the deboning machine 20, 320.

It is to be understood that while two thread forms 150a, 150b are shown and described in the deboning machine 20 of the first embodiment that only a single Acme thread may also be provided in the deboning machine 20 of the first embodiment. While a single Acme thread is shown and described in the deboning machine 320 of the second embodiment, two thread forms 150a, 150b like that of the first embodiment may also be provided.

It is to be understood that while the pins 144, 444 are described as being on the outer housing 52, 352 and the pockets 132, 432 are described as being on the separation chamber 22, 422, that the pins 144, 444 can be provided on the separation chamber 22, 422 and the pockets 132, 432 on the outer housing 52, 352. Also, pins 144, 444 can be integrally formed with these components. Pins 142 can be integrally formed with the outer housing 52.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A deboning machine comprising:
a housing, said housing having a passageway and ports for expelling meat and bone from said housing;
a separation chamber mounted in said passageway of said housing, said separation chamber having an end;
an auger extending through said separation chamber and said housing, said auger rotatably attached to said housing; and
an engagement structure comprising a pin extending from one of said housing and said separation chamber and a pocket provided in the other of said housing and said separation chamber, said pocket having a camming surface, said pin being seated within said pocket to engage said separation chamber with said housing, wherein engagement of said pin with said camming surface provides a space between said separation chamber and said auger.

2. The deboning machine of claim 1, wherein said pin extends from said housing, said pocket is provided in said separation chamber.

3. The deboning machine of claim 2, wherein two said pins and pockets are provided.

4. The deboning machine of claim 2, wherein said separation chamber has a first end which is first inserted into said passageway of said housing to engage said pin within said pocket, and a second opposite end, wherein said pocket is provided proximate to said second end of said separation chamber.

5. The deboning machine of claim 4, wherein said separation chamber further includes a slot at said first end thereof, and said housing has a second pin extending therefrom, said second pin engaging with said slot when said separation chamber is seated within said housing.

6. The deboning machine of claim 2, wherein said separation chamber has a first end which is first inserted into said passageway of said housing to engage said pin within said pocket, and a second opposite end, wherein said pocket is provided proximate to said first end of said separation chamber.

7. The deboning machine of claim 1, wherein two said pins and pockets are provided.

8. The deboning machine of claim 7, wherein two said pins are diametrically opposed on said housing.

9. The deboning machine of claim 1, wherein said separation chamber has a first end which is first inserted into said passageway of said housing to engage said pin within said pocket, and a second opposite end, wherein said engagement structure on said separation chamber is provided proximate to said second end of said separation chamber.

10. The deboning machine of claim 1, wherein said separation chamber has a first end which is first inserted into said passageway of said housing to engage said pin within said pocket, and a second opposite end, wherein said engagement structure on said separation chamber is provided proximate to said first end of said separation chamber.

11. The deboning machine of claim 1, further comprising a ring valve mounted on said auger and a ratchet assembly attaching said ring valve to said housing.

12. The deboning machine of claim 1, wherein said pocket has an entry section which is parallel to a centerline of the separation chamber, and said camming surface is angled relative to a line transverse to said centerline.

13. The deboning machine of claim 1, wherein said separation chamber has a conical shape and at least one flat surface proximate to an end thereof, said flat being engaged by a wrench to rotate said separation chamber relative to said auger.

14. The deboning machine of claim 1, further including a wrench capable of engaging with said separation chamber.

15. A method of assembling a deboning machine comprising:
- inserting a separation chamber into a passageway of a housing, wherein during said insertion, an engagement structure provided on said housing and said separation chamber engages with each other;
- inserting an auger into said separation chamber and said housing;
- engaging said auger with said housing; and
- holding said auger stationary and rotating said separation chamber relative to said auger and relative to said housing to provide a space between the separation chamber and the auger.

16. The method of claim 15, further comprising using a wrench to engage a flat surface on said separation chamber to rotate said separation chamber relative to said auger and relative to said housing.

17. The method of claim 15, wherein said engagement structure comprises a pin provided on one of said housing and said separation chamber and a pocket provided in the other of said housing and said separation chamber, said pocket having a camming surface, wherein during insertion of said separation chamber into said housing, said pin seats within said pocket and engages with a camming surface of said pocket.

* * * * *